(12) United States Patent
Hutter

(10) Patent No.: US 6,488,314 B1
(45) Date of Patent: Dec. 3, 2002

(54) COUPLING JOINT FOR A COUPLE OF PIPES

(75) Inventor: Gerald Hutter, Attimis (IT)

(73) Assignee: Raco S.p.A., Attimis (IT)

( * ) Notice: Subject to any disclaimer, the term of this patent is extended or adjusted under 35 U.S.C. 154(b) by 0 days.

(21) Appl. No.: 09/890,477

(22) PCT Filed: Feb. 11, 2000

(86) PCT No.: PCT/IT00/00041

§ 371 (c)(1),
(2), (4) Date: Jan. 7, 2002

(87) PCT Pub. No.: WO00/50799

PCT Pub. Date: Aug. 31, 2000

(30) Foreign Application Priority Data

Feb. 22, 1999  (IT) ...................................... UD9900015 U

(51) Int. Cl.[7] ................................................. F16L 39/00
(52) U.S. Cl. ................................ 285/124.1; 285/124.2; 285/293.1
(58) Field of Search ........................... 285/124.1, 124.2, 285/124.3, 124.4, 124.5, FOR 118, 293.1, 188

(56) References Cited

U.S. PATENT DOCUMENTS

| | | | | |
|---|---|---|---|---|
| 3,163,448 A | * | 12/1964 | Franklin | ..................... 138/112 |
| 3,469,863 A | * | 9/1969 | Riester et al. | ............... 277/322 |
| 3,471,178 A | * | 10/1969 | Roe | ......................... 285/124.1 |
| 4,900,065 A | * | 2/1990 | Houck | ...................... 285/124.4 |
| 5,390,966 A | * | 2/1995 | Cox et al. | ................. 166/241.6 |
| 5,848,814 A | * | 12/1998 | Nadasky et al. | ............. 277/648 |
| 5,944,360 A | * | 8/1999 | Crapart | ..................... 285/124.2 |
| 5,966,932 A | * | 10/1999 | Yahagi | ..................... 285/124.1 |

FOREIGN PATENT DOCUMENTS

| | | |
|---|---|---|
| CH | 664 431 | 2/1988 |
| DE | 296 00 556 | 7/1996 |
| EP | 0 603 032 | 6/1994 |

* cited by examiner

Primary Examiner—Eric K. Nicholson
(74) Attorney, Agent, or Firm—Harrison & Egbert

(57) ABSTRACT

Improved coupling point for a couple of pipes characterized by realizing direct die-injection in plastic material on both pipe ends, a spacing element (31) inserted on the pipes both ends (1,2), and respective sleeves (33) which are inserted on the pipe ends (1,2) and extend beyond the pipe ends (1,2), the extension inside diameter of the sleeves (331) being the diameter for the keying to the pipes to be jointed; at least a part of the sleeve being inserted on the pipe (332) up to coating a suitable protrusion (11) of the pipe.

2 Claims, 2 Drawing Sheets

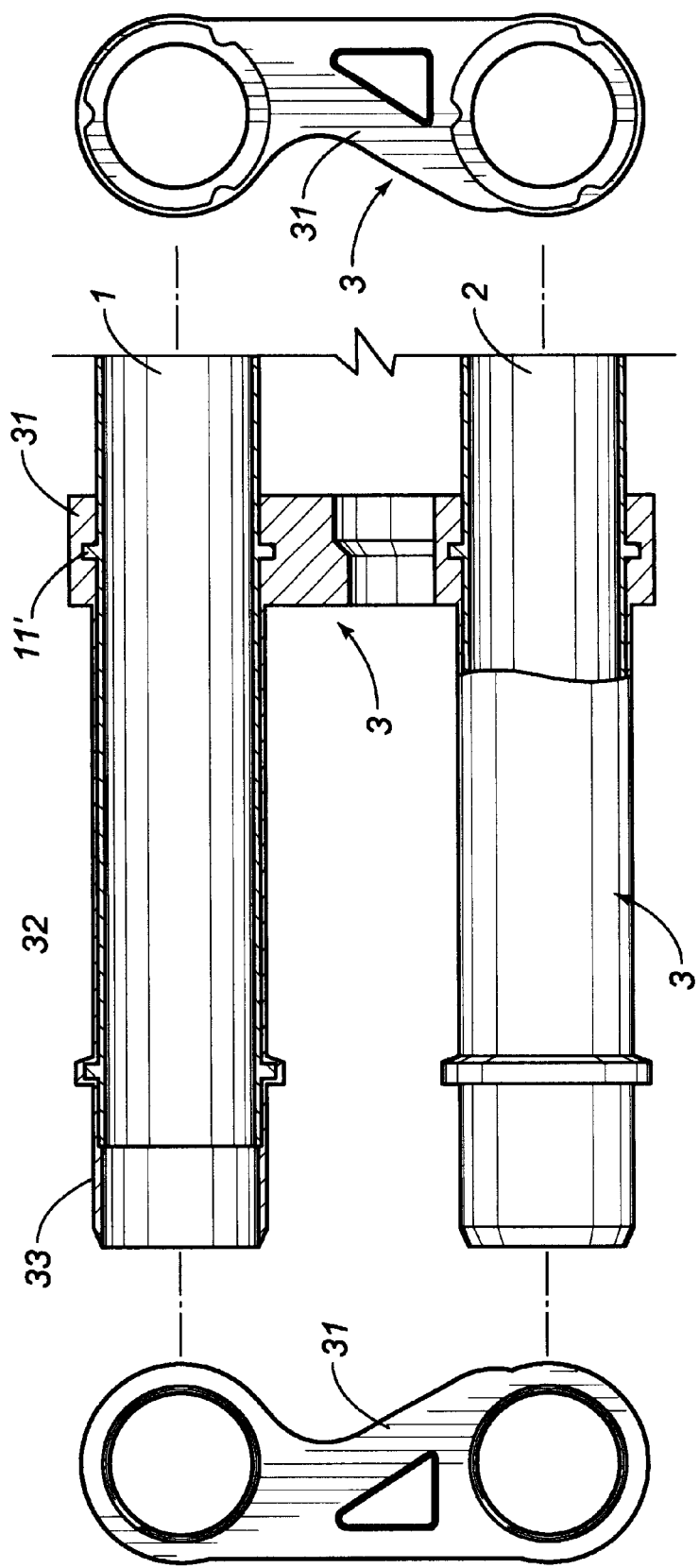

COUPLING JOINT FOR A COUPLE OF PIPES

BACKGROUND OF THE INVENTION

1. Field of the Invention

The present invention has for object an improved coupling joint for a couple of pipes.

The present invention is preferably, even if not necessarily, applied in the installation of air-conditioning systems (i.e. heating systems) i n vehicles.

The vehicles equipped with this device are also objects of the present invention.

2. Description of the Related Art

In prior art the production of heat exchangers for air-conditioning systems in vehicles or motor cars, which is carried out by prearranging a suitable expansion in the coupling pipes which in this case are made up of aluminium, to be connected to the radiator of the vehicle, is known.

The present sealing couplings are therefore obtained by plastic deformation of the aluminium (or copper) pipes ending part. The rising problems consist of:

dimensional problems (difficult observance of tolerances)
roughness
cost of the double work.

EP-A-0603302 discloses a coupling joint for a couple of pipes at the ends of which a spacing plastic insertion with single flange-shape abutment is made, covering both ends of the pipes, extending from one side over the ends of both said pipes and from the other side to realize prolongation of the pipes themselves. This solution regarding covering a cylindrical extension of said pipes, the covering joint surface having no-change in diameter.

BRIEF SUMMARY OF THE INVENTION

The purpose of the present invention is that of obviating the above mentioned drawbacks.

The problem is solved by the joint as defined in independent claim 1.

With this solution:

a low cost material can be used
only a single moulding operation is carried out;
the tolerances obtained are optimal since during the moulding they are able to use respective axial bushes directly from the die also obtaining a total observance of the roughness in order to avoid the danger of the coupling's leakage, generally made up of sealing gaskets.

Preferably, said spacing element, and said sleeves are connected by a corresponding extension to a coating section extending above said pipes making up a moulding single piece.

In this way the costs are further reduced
a more effective and stronger coupling structure is obtained.

As much advantageously said extension extends up to being inserted on a respective outside backed circumferential rib of said pipe. In this way the advantage of making not axially movable (unlineable) said coating which makes up the coupling sleeve is obtained.

BRIEF DESCRIPTION OF THE SEVERAL VIEWS OF THE DRAWINGS

These and other advantages will appear from the following description of a preferred embodiment, with the aid of the enclosed drawings, whose details are not to be considered as limiting but are only given as examples.

FIG. 3 is a partial sectional side view of a preferred embodiment of the present invention and FIGS. 4 and 5 are top-end views and opposed sectional views with respect to the coupling end.

DETAILED DESCRIPTION OF THE INVENTION

Figure 1:
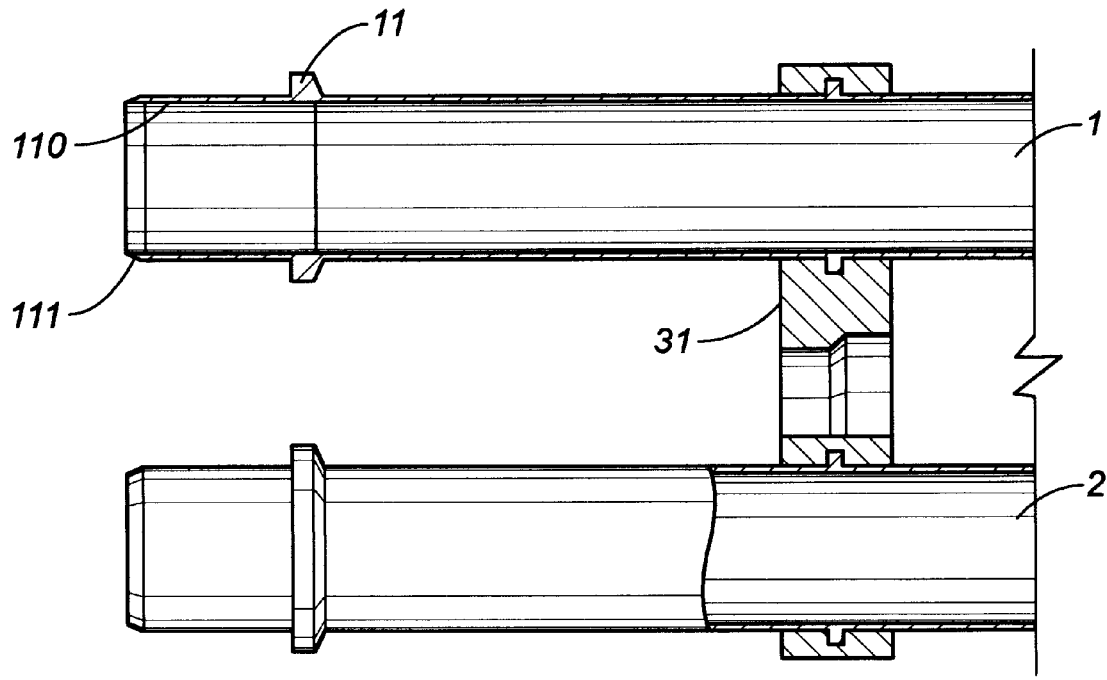
FIG. 1 is a perspective view of the coupling end of the double pipe, according to the known art.
Figure 2:
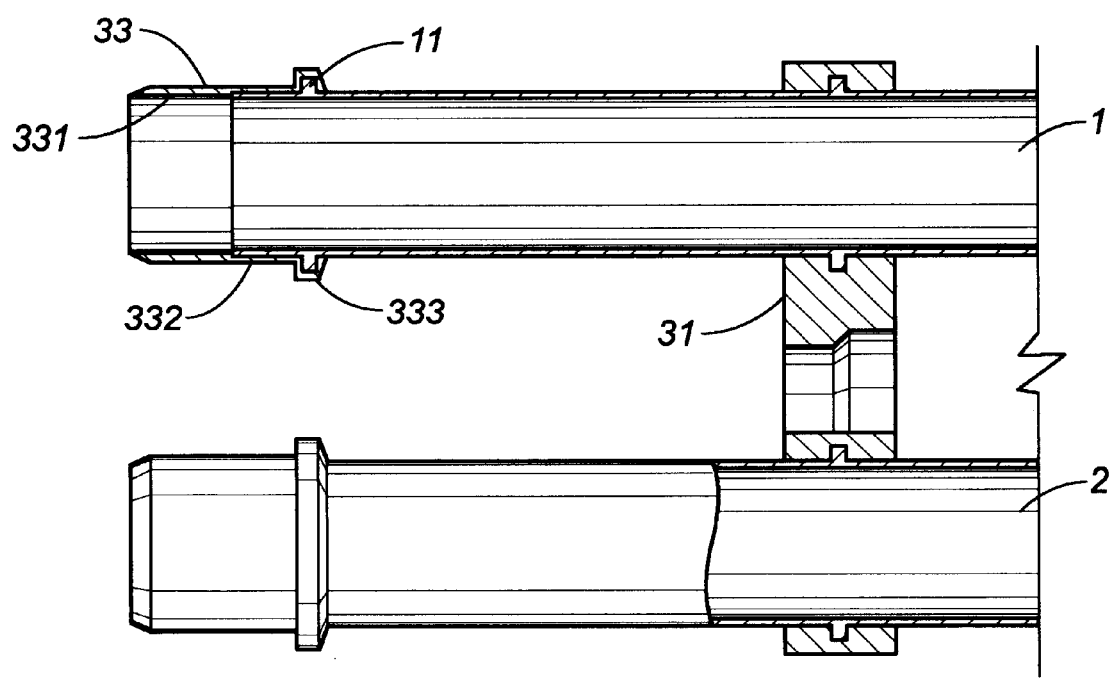
FIG. 2 is a schematic view of a first form of embodiment according to the present invention.

Referring to FIG. 1, it may be noticed that a spacer generally in plastic material (31) directly moulded on the couple of pipes (1,2) is used in it, while the respective pipes have an enlarged end diameter for the female coupling (111), also being provided a mouthing chamber (110).

The drawbacks are evident.

difficulty of alignment of the pipes ends;
complex and expensive work for the pipes enlarging (110) together with a necessary contact flanging (11).

Instead according to the invention:

the pipe enlargement by means of a directly moulded sleeve (321-332-333) on the pipe end by coating the contact rib (11) is obtained;

thus obtaining clear advantages of cost and performance.

Advantageously said spacer (31) is moulded in a single body b y extrusion (32) which joints both pieces into a single block, being the axial locking rib (11') in correspondence of said spacer (31 FIG. 3).

Thus the advantages and the utility are even more evident, at the same time obtaining a joint's higher strength and solidity.

I claim:

1. A coupling joint assembly comprising:

a first pipe formed of a polymeric material and having a protrusion extending radially outwardly therefrom;

a second pipe formed of a polymeric material and having a protrusion extending radially outwardly therefrom, said second pipe extending in spaced parallel relation to said first pipe;

a spacing element affixed to one end of said first and second pipes and extending therebetween;

a first sleeve affixed to an opposite end of said first pipe and having a section extending outwardly beyond said opposite end, said first sleeve having a portion forming a coating over said protrusion of said first pipe, said section of said first sleeve having an interior diameter means for jointed connection to a third pipe; and a second sleeve affixed to an opposite end of said second pipe and having a section extending outwardly beyond said opposite end of said second sleeve, said second sleeve having a portion forming a coating over said protrusion of said second pipe, said section of said second sleeve having an interior diameter means for jointed connection to a fourth pipe.

2. The joint assembly of claim 1, further comprising:

a coating section connected integrally to said spacing element and to said first and second sleeves, said coating section covering an exterior surface of said first and second pipes.

* * * * *